US 6,628,365 B1

(12) United States Patent
Park et al.

(10) Patent No.: US 6,628,365 B1
(45) Date of Patent: Sep. 30, 2003

(54) LCD WITH UV SHIELDING PART AT DUMMY SEALANT REGION

(75) Inventors: Moo Yeol Park, Taegu-kwangyokshi (KR); Sung Su Jung, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/265,435

(22) Filed: Oct. 7, 2002

(30) Foreign Application Priority Data

Mar. 23, 2002 (KR) ........................................ 2002-15886

(51) Int. Cl.[7] ..................... G02F 1/1339; G02F 1/1341; G02F 1/1333
(52) U.S. Cl. ..................... 349/153; 349/158; 349/190
(58) Field of Search ................................ 349/153, 154, 349/158, 189, 190, 75, 74

(56) References Cited

U.S. PATENT DOCUMENTS

| 3,978,580 | A | | 9/1976 | Leupp et al. |
|---|---|---|---|---|
| 4,094,058 | A | | 6/1978 | Yasutake et al. |
| 4,653,864 | A | | 3/1987 | Baron et al. |
| 4,691,995 | A | | 9/1987 | Yamazaki et al. |
| 4,775,225 | A | | 10/1988 | Tsuboyama et al. |
| 5,247,377 | A | | 9/1993 | Omeis et al. |
| 5,263,888 | A | | 11/1993 | Ishihara et al. |
| 5,379,139 | A | | 1/1995 | Sato et al. |
| 5,406,989 | A | | 4/1995 | Abe |
| 5,410,423 | A | * | 4/1995 | Furushima et al. ......... 349/190 |
| 5,499,128 | A | | 3/1996 | Hasegawa et al. |
| 5,507,323 | A | | 4/1996 | Abe |
| 5,511,591 | A | | 4/1996 | Abe |
| 5,539,545 | A | | 7/1996 | Shimizu et al. |
| 5,548,429 | A | | 8/1996 | Tsujita |
| 5,642,214 | A | | 6/1997 | Ishii et al. |
| 5,680,189 | A | | 10/1997 | Shimizu et al. |
| 5,742,370 | A | | 4/1998 | Kim et al. |
| 5,757,451 | A | | 5/1998 | Miyazaki et al. |
| 5,852,484 | A | | 12/1998 | Inoue et al. |
| 5,854,664 | A | | 12/1998 | Inoue et al. |
| 5,861,932 | A | | 12/1998 | Inata et al. |
| 5,875,922 | A | | 3/1999 | Chastine et al. |
| 5,952,678 | A | | 9/1999 | Ashida |
| 5,956,112 | A | | 9/1999 | Fujimori et al. |
| 6,001,203 | A | | 12/1999 | Yamada et al. |
| 6,011,609 | A | | 1/2000 | Kato et al. |
| 6,016,178 | A | | 1/2000 | Kataoka et al. |
| 6,016,181 | A | | 1/2000 | Shimada |
| 6,055,035 | A | | 4/2000 | von Gutfeld et al. |
| 6,163,357 | A | | 12/2000 | Nakamura |
| 6,181,405 | B1 | * | 1/2001 | Izumi ......................... 349/153 |
| 6,219,126 | B1 | | 4/2001 | von Gutfeld |
| 6,226,067 | B1 | | 5/2001 | Nishiguchi et al. |

(List continued on next page.)

FOREIGN PATENT DOCUMENTS

| EP | 1003066 A1 | 5/2000 |
|---|---|---|
| JP | 51-065656 | 6/1976 |
| JP | 57038414 | 3/1982 |

(List continued on next page.)

Primary Examiner—Toan Ton
(74) Attorney, Agent, or Firm—McKenna Long & Aldridge LLP

(57) ABSTRACT

An LCD device and a method for manufacturing the same are disclosed. The LCD device includes a substrate; a UV hardening main sealant on the substrate; a UV hardening dummy sealant in a region between the UV hardening main sealant and an edge of the substrate; and a UV shielding part formed in a portion where the UV hardening dummy sealant is overlapping with a cell-cutting line. Also, a UV blocking part is formed under the UV hardening dummy sealant in a portion where the UV hardening dummy sealant is overlapped with a cell-cutting line, so that the sealant formed under the UV blocking part is not hardened, thereby easily cutting the substrate into unit cells.

28 Claims, 7 Drawing Sheets

U.S. PATENT DOCUMENTS

| | | |
|---|---|---|
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,327,015 B2 * | 12/2001 | Awane et al. ............... 349/158 |
| 6,337,730 B1 | 1/2002 | Ozaki et al. |
| 6,414,733 B1 | 7/2002 | Ishikawa et al. |

FOREIGN PATENT DOCUMENTS

| | | |
|---|---|---|
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 5127179 | 5/1993 |
| JP | 5-154923 | 6/1993 |
| JP | 5265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 6-235925 | 8/1994 |
| JP | 06265915 | 9/1994 |
| JP | 6-313870 | 11/1994 |
| JP | 7-084268 | 3/1995 |
| JP | 07128674 | 5/1995 |
| JP | 07181507 | 7/1995 |
| JP | 08095066 | 4/1996 |
| JP | 8-101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 9-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001091727 | 4/2001 |
| JP | 2001117105 | 4/2001 |
| JP | 2001-117109 | 4/2001 |
| JP | 2001-133745 | 5/2001 |
| JP | 2001133794 | 5/2001 |
| JP | 2001-133799 | 5/2001 |
| JP | 2001142074 | 5/2001 |
| JP | 2001147437 | 5/2001 |
| JP | 2001154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |

* cited by examiner

LCD WITH UV SHIELDING PART AT DUMMY SEALANT REGION

This application claims the benefit of the Korean Application No. P2002-15886 filed on Mar. 23, 2002, which is hereby incorporated by reference as if fully set forth herein.

BACKGROUND OF THE INVENTION

1. Field of the Invention

The present invention relates to a liquid crystal display (LCD) device, and more particularly, to an LCD device according to a liquid crystal dispensing method, and a method for manufacturing the same.

2. Discussion of the Related Art

Generally, ultra thin sized flat panel displays having a display screen with a thickness of several centimeters or less, and in particular, flat panel LCD devices, are widely used in monitors for notebook computers, spacecraft, and aircraft because such LCD devices have low power consumption because of a low driving voltage and are easy to carry.

Such LCD devices include a lower substrate, an upper substrate and a liquid crystal layer. A thin film transistor (TFT) and a pixel electrode are formed on the lower substrate. A light-shielding layer, a color filter layer and a common electrode are formed on the upper substrate, which is opposite to the lower substrate. Then, the liquid crystal layer is formed between the lower and upper substrates. In operation, an electric field is generated between the lower and upper substrates by the pixel and common electrodes, so that the alignment of molecules in the liquid crystal layer is driven by the electric field. Transmissivity of light through the liquid crystal layer is controlled with driving the liquid crystal layer, thereby displaying an image.

In manufacturing this LCD device, a vacuum injection method based on capillary phenomenon and pressure difference has been conventionally used to form the liquid crystal layer between lower and upper substrates. However, such a vacuum injection method has a problem in that it takes a long time to inject the liquid crystal due to the large sized display area, thereby reducing the productivity.

A liquid crystal dispensing method has been proposed to solve such a problem. A prior art method for manufacturing an LCD device based on the liquid crystal dispensing method will be explained with reference to FIG. 1A to FIG. 1D.

As illustrated in FIG. 1A, a lower substrate 1 and an upper substrate 3 are prepared. Although not shown in drawings, a plurality of gate and data lines are formed on the lower substrate 1. The gate lines cross the data lines to define pixel regions. A thin film transistor (TFT) is formed at each crossing point between the gate and data lines. A pixel electrode connected with the thin film transistor is formed in the pixel region.

A light-shielding layer is formed on the upper substrate 3 to prevent light from leaking out from the gate and data lines and the thin film transistor. Color filter layers of red(R), green(G), and blue(B) are formed on the light-shielding layer, and a common electrode is formed on the color filter layers. An alignment layer is formed on at least one of the lower substrate 1 and the upper substrate 3 to initially align molecules in a liquid crystal to be interposed between the upper and lower substrates 1 and 3.

As shown in FIG. 1B, main and dummy sealants 7, 8 are formed on the lower substrate 1. A liquid crystal 5 is dropped onto so that a liquid crystal layer is formed. A spacer (not shown) is spread onto the upper substrate 3 to maintain a cell gap. The main sealant 7 prevents the liquid crystal from flowing out, and bonds the lower and upper substrates to each other. The dummy sealant 8 is formed in the circumference of the main sealant 7 to protect the main sealant 7.

In the liquid crystal dispensing method, the liquid crystal layer is formed on the substrates before they are attached in a sealant hardening process. If a heat-hardening type sealant is used for the sealant, the liquid crystal which flows during the heating may be contaminated by the sealant. For this reason, a UV-hardening type sealant is used for the sealant in the liquid crystal dispensing method.

As shown in FIG. 1C, the lower substrate 1 is attached to the upper substrate 3.

Referring to FIG. 1D, the main sealant 7 is hardened by irradiating UV light onto the sealant with a UV irradiating device 9, thereby bonding the lower substrate 1 to the upper substrate 3.

As shown in FIG. 1E, the lower and upper substrates 1, 3 are cut into unit cells, thereby forming liquid crystal cells.

FIG. 2 illustrates a perspective view for showing cutting steps of the substrate into the unit cells.

As shown in FIG. 2, the bonded substrates are cut into unit cells. In the cutting step, after forming a cutting line (scribing process) on a surface of the bonded substrates by a scriber, such as a diamond pen with a hardness higher than glass of the substrates, a mechanical impact is applied to the bonded substrates along the cutting line by using a breaker (a breaking process), to obtain a plurality of unit cells at the same time. Alternatively, a pen or wheel of diamond may be used to carry out the scribing and the breaking in one step, to obtain the unit cell one by one.

Even though the cutting line 10 is not shown in FIG. 2, the plurality of cutting lines are formed to remove dummy regions of the circumference when practically cutting the cells.

FIG. 3 illustrates a plan view for showing the cell cutting line 10 of the lower substrate 1 on which the sealant 7,8 is formed. Referring to FIG. 3, the cutting line 10 is overlapped with a predetermined region (circle region) of the dummy sealant 8. At this time, the dummy sealant 8 is hardened in the UV irradiating step before cutting the substrate into the cells.

If the substrate is cut into the cells in the break process after the scribing process, a problem is not generated by the hardened dummy sealant 8. However, if the unit cell is obtained one by one by carrying out the scribing/breaking process at the same time, it is hard to cut the substrate into the cells due to the hardened dummy sealant 8.

SUMMARY OF THE INVENTION

Accordingly, the present invention is directed to an LCD device and a method for manufacturing the same that substantially obviates one or more problems due to limitations and disadvantages of the related art.

An advantage of the present invention is to provide to an LCD and a method for manufacturing the same, in which a substrate is cut into unit cells in an easier way by carrying out scribe and break processes at the same time.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device according to the present invention includes a substrate; a UV hardening main sealant on the substrate; a UV hardening dummy sealant in a region between the UV hardening main sealant and an edge of the substrate; and a UV shielding part formed in a portion where the UV hardening dummy sealant is overlapped with a cell-cutting line.

In another aspect, a method for manufacturing an LCD device according to the present invention includes preparing first and second substrates; forming a UV shielding part in a dummy region on one of first and second substrates; forming a UV hardening main sealant on the substrate on which the UV shielding part is formed; forming a UV hardening dummy sealant on the substrate between the UV hardening main sealant and an edge of the substrate; applying a liquid crystal on one of the first and second substrates; attaching the first and second substrates; irradiating UV light onto the UV hardening main sealant and UV hardening dummy sealant; and cutting the substrates into unit cells.

Also, a UV blocking part is formed under the UV hardening dummy sealant in a portion where a UV hardening dummy sealant is overlapped with a cell-cutting line, so that the sealant formed under the UV blocking part is not hardened, thereby easily cutting the substrate into unit cells.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1A:
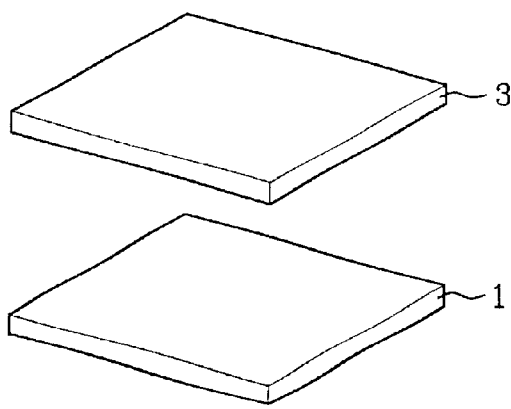
FIG. 1A to FIG. 1E illustrate perspective views for showing manufacturing process steps of a liquid crystal display device by a related art liquid crystal dispensing method.
Figure 1B:
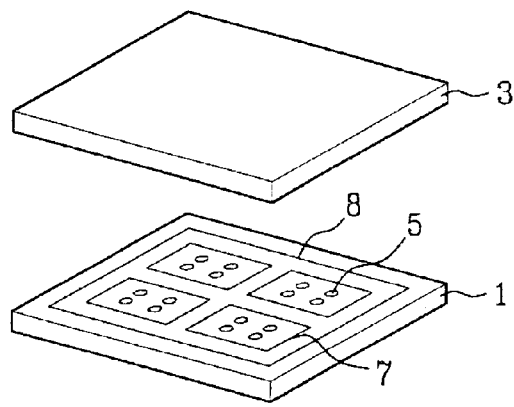
Figure 1C:
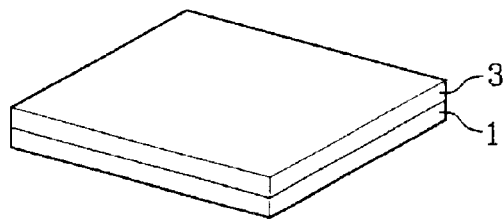
Figure 1D:
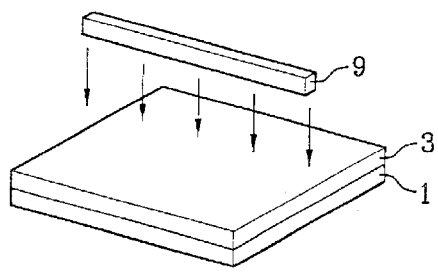
Figure 1E:
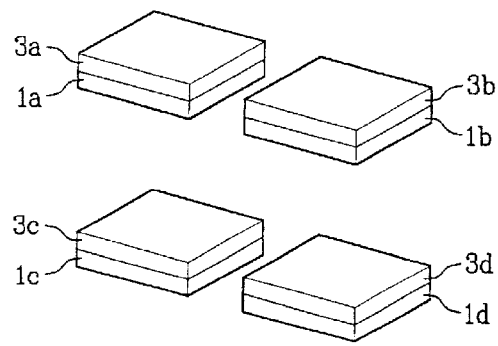
Figure 2:
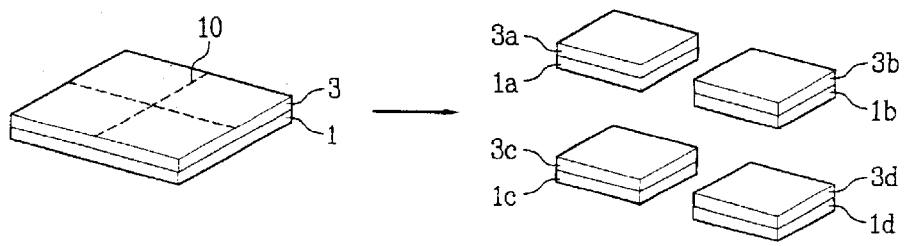
FIG. 2 illustrates a perspective view for showing a related art cell cutting process step.
Figure 3:
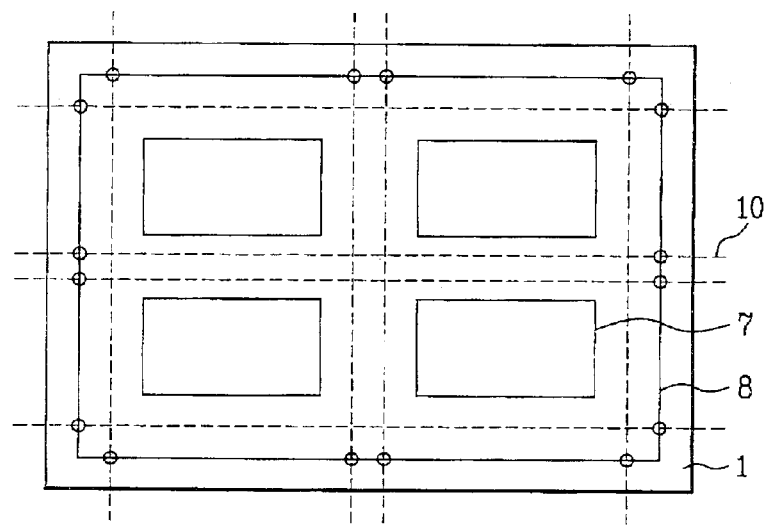
FIG. 3 illustrates a plan view for showing a cell cutting line of a lower substrate in a liquid crystal display device having a related art sealant.
Figure 4A:
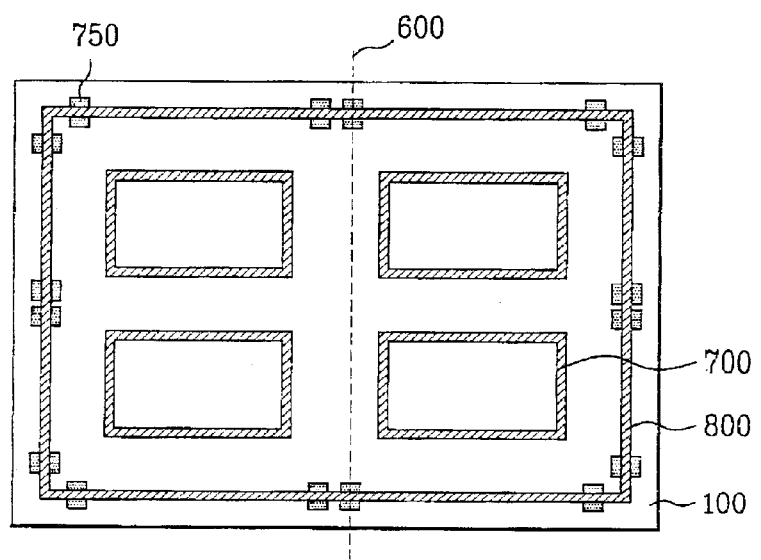
FIG. 4A illustrates a plan view for showing one substrate of a liquid crystal display device according to a first embodiment of the present invention.

FIG. 4A illustrates a plan view for showing one substrate of an LCD device according to a first embodiment of the present invention. In FIG. 4A, four unit cells are shown, however, the number of the unit cell may be increased or decreased.

Referring to FIG. 4A, a UV hardening main sealant 700 is formed in a closed type having no injection hole on a substrate 100. A UV hardening dummy sealant 800 is formed in a closed type at the circumference of the UV hardening main sealant 700. Monomers or oligomers each having both ends coupled to acrylic group mixed with an initiator are used as the UV hardening main and dummy sealants 700, 800; or, monomers or oligomers each having one end coupled to acrylic group and the other end coupled to epoxy group mixed with an initiator are used as the UV hardening main and dummy sealants 700, 800.

A UV blocking part 750 is formed under the UV hardening dummy sealant 800 in a portion where the UV hardening dummy sealant 800 overlaps with a cell-cutting line 600. Preferably, the UV blocking part is formed at a thickness between about 1000 Å and 2000 Å. The UV blocking part 750 has no influence on cell cutting at this thickness. That is, the UV blocking part 750 may be made of any one of materials such as a metal that can block UV light, at this thickness.

In the LCD device according to the first embodiment of the present invention shown in FIG. 4A, the UV blocking part 750 is formed under the UV-hardening dummy sealant 800 in every portion where the UV hardening dummy sealant 800 overlaps with the cell-cutting line 600. In a process step for cutting the cell along the cell cutting line according to scribe/break process, the substrate is cut from one of left or right side, so that the UV hardening dummy sealant 800 provided at left or right side is removed during cutting the cells. Accordingly, the removed UV hardening dummy sealant 800 has no influence on the following cell cutting process.

Figure 4B:
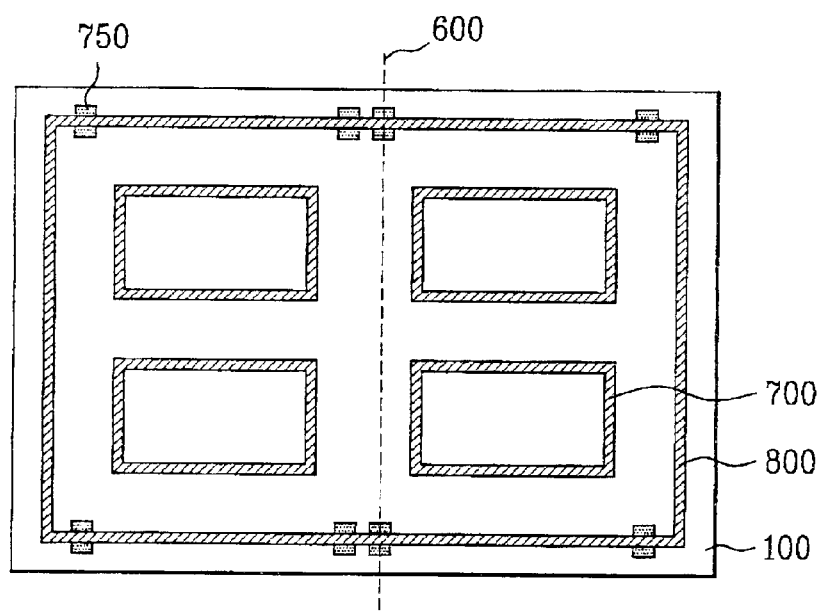
FIG. 4B and FIG. 4C illustrate plan views for showing one substrate of a liquid crystal display device according to a second embodiment of the present invention.
Figure 4C:
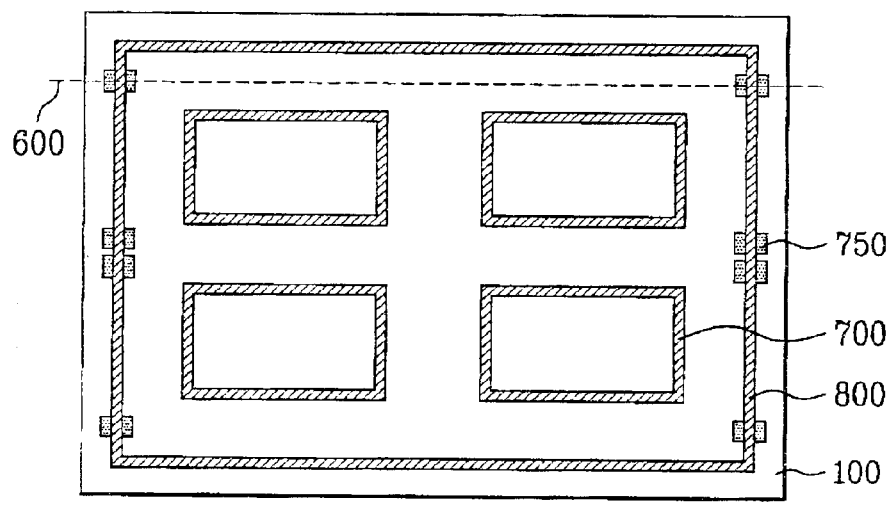

As shown in FIG. 4B, the UV blocking part 750 may be formed under the UV-hardening dummy sealant 800 in lower and upper portions of the overlapped regions between the UV hardening dummy sealant 800 and the cell-cutting line 600. As shown in FIG. 4C, the UV blocking part 750 may be formed under the UV hardening dummy sealant 800 in left and right portions of the overlapped regions between the UV hardening dummy sealant 800 and the cell-cutting line 750, thereby easily cutting the substrate into the cells. The case shown in FIG. 4B is applied to a case of that the substrate is cut in lower and upper directions, and the case shown in FIG. 4C is applied to a case of that the substrate is cut in left and right directions.

Meanwhile, the liquid crystal layer is formed between the lower and upper substrates. At this time, the sealant may be formed any one of the lower and upper substrates.

If one substrate shown in FIG. 4A to FIG. 4C is the lower substrate, gate and data lines, a TFT and a pixel electrode are formed on the lower substrate. The UV blocking part 750 may be formed on the same layer as the gate or data lines, or may be formed on an additional layer. If formed on the same layer as the gate or data lines, the UV blocking part 750 may be made of the same material as the gate or data lines.

If one substrate shown in FIG. 4A to FIG. 4C is the upper substrate, a light-shielding layer, a color filter layer and a common electrode are formed on the upper substrate. The UV blocking part 750 may be formed on the same layer as the light-shielding layer, or may be formed on an additional layer. If formed on the same layer as the light-shielding layer, the UV blocking part 750 may be made of the same material as the light-shielding layer.

Also, a column spacer may be formed on any of the lower and upper substrates maintain a cell gap. The column spacer is formed on a portion that corresponds to the gate line or the data line. Preferably, the column spacer is made of photo-sensitive organic resin.

FIG. 5A to FIG. 5F illustrate perspective views for showing manufacturing process of an LCD device according to the first embodiment of the present invention. In the drawings, four cells are shown, however, the number of the unit cells may be increased or decreased.

Figure 5A:
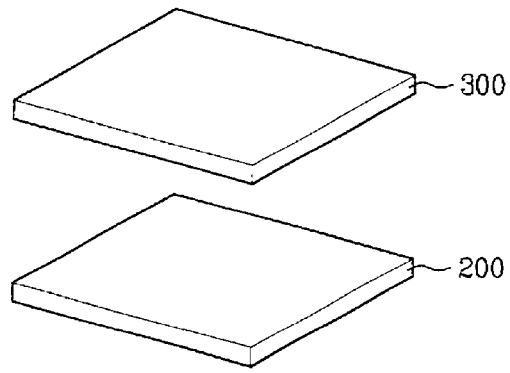
FIG. 5A to FIG. 5F illustrate perspective views for showing manufacturing process of a liquid crystal display device according to the first embodiment of the present invention.

As shown in FIG. 5A, the lower and upper substrates 200, 300 are prepared. Although not shown, the plurality of gate lines are formed on the lower substrate 200 to cross the plurality of data lines, thereby defining pixel regions. Then, a thin film transistor including a gate electrode, a gate insulating layer, a semiconductor layer, an ohmic contact layer, source/drain electrodes and a passivation layer is formed at each crossing point of the gate and data lines. Pixel electrodes connected to the thin film transistors are formed in the respective pixel regions.

An alignment layer is formed on the pixel electrode to initially align the liquid crystal. The alignment layer may be formed of polyimide, polyamide group compound, polyvinylalcohol(PVA), polyamic acid by rubbing, or a photosensitive material, such as polyvinvylcinnamate (PVCN), polysilioxanecinnamate(PSCN), or cellulosecinnamate(CelCN) group compound by photo-alignment.

The light-shielding layer is formed on the upper substrate 300 for shielding light from leaking onto the gate lines, the data lines, and the thin film transistors. The color filter layer of red (R), green (G), and blue (B), is formed on the light-shielding layer. The common electrode is formed on the color filter layer. An overcoat layer may be additionally formed between the color filter layer and the common electrode. Also, the aforementioned alignment layer is formed on the common electrode.

Silver (Ag) dots are formed on the lower substrate 200, for applying a voltage to the common electrode on the upper substrate 300 after the lower and upper substrates 200, 300 are attached with each other. The silver dots may be formed on the upper substrate 300.

In an LCD device of In Plane Switching (IPS) mode, the common electrode and the pixel electrode are formed on the lower substrate, so that an electric field that is parallel to the substrate is induced, and the silver dots are not formed on the substrates.

Figure 5B:
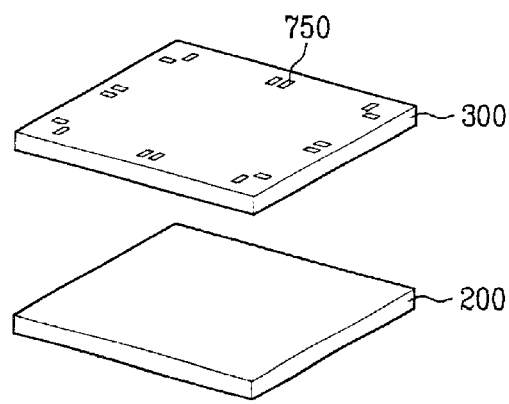

Referring to FIG. 5B, the UV blocking part 750 is patterned on the dummy region of the upper substrate 300. More particularly, the UV blocking part 750 is formed in the portion where the dummy region overlaps with the cell cutting line for a subsequent cell cutting process. Preferably, the UV blocking part 750 is made of a material that has no bad influence on the cell cutting process.

FIG. 5B illustrates a case in which the UV blocking part 750 is formed on every portion of the substrate where the dummy region overlaps with the cell-cutting line. The UV blocking part 750 may be formed on left and right portions of the overlapped region between the dummy sealant and the cell-cutting line, or may be formed on lower and upper portions of the overlapped region between the dummy sealant and the cell-cutting line. Also, the UV blocking part 750 is formed on the upper substrate 300 in the drawings. However, it is possible to form the UV blocking part 750 on the lower substrate 200.

FIG. 5B illustrates a case in which the UV blocking part 750 is formed on an additional layer. However, the UV blocking part 750 may be formed with forming a layer during preparing the lower substrate 200 or the upper substrate 300.

If the UV blocking part 750 is formed on the lower substrate 200, the UV blocking part 750 may be formed during forming the gate or data line with the same material as the gate or data line. If the UV blocking part 750 is formed on the upper substrate 300, the UV blocking part 750 may be formed during forming the light-shielding layer with the same material as the light-shielding layer.

Figure 5C:
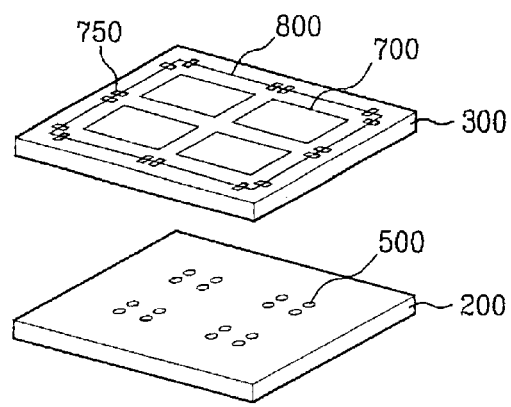

Referring to FIG. 5C, the UV hardening main sealant 700 of the closed type is formed on the upper substrate 300 on which the UV blocking part 750 is patterned. Then, the UV hardening dummy sealant 800 of the closed type is formed on the circumference of the upper substrate overlapping with the UV blocking part 750.

The sealant forming method is divided into two types, a screen printing method and a dispensing method. In the screen printing method, since a screen contacts the substrate, the alignment layer formed on the substrate may be damaged. Also, with a trend toward the large-sized LCD device; the sealant is used in great quantities, so that it is useful to form the sealant by the dispensing method.

Monomers or oligomers each having both ends coupled to acrylic group mixed with an initiator are used as the sealant; or, monomers or oligomers each having one end coupled to acrylic group and the other end coupled to epoxy group mixed with an initiator are used as the sealant.

Also, the liquid crystal 500 is dropped on the lower substrate 200, thereby forming a liquid crystal layer.

If the liquid crystal 500 contacts the main sealant 700 before the main sealant 700 is hardened, the liquid crystal 500 is contaminated. Accordingly, it is preferable to drop the liquid crystal 500 in the center of the lower substrate 200. Then, the liquid crystal 500 gradually spreads onto the entire substrate at a constant rate until hardening the main sealant 700.

In the drawings, the liquid crystal 500 is dropped on the lower substrate 200, and the UV blocking part 750 and the sealant 700, 800 are formed on the upper substrate 300. However, it is not limited to this. That is, the liquid crystal 500 may be formed on the upper substrate 300, and the UV blocking part 750 and the UV hardening main and dummy sealants 700, 800 may be formed on the lower substrate 200. Also, the liquid crystal 500, the UV blocking part 750 and the UV hardening main and dummy sealant 700, 800 may be formed on the same substrate.

If the liquid crystal 500 is formed on the same layer as the UV hardening main and dummy sealants 700, 800, processing time is unbalanced between the substrate having the liquid crystal 500 and the UV hardening main and dummy sealants 700, 800 and the other substrate, thereby increasing processing time. Also, if the sealant is contaminated before attaching the substrates to each other, it is impossible to clean the substrate since the liquid crystal and the UV hardening main and dummy sealants are formed on the same substrate. Preferably, the liquid crystal is formed on the different substrate from the UV hardening main and dummy sealants.

Although not shown, a spacer may be formed on any one of the lower and upper substrates 200, 300, preferably on the upper substrate 300, for maintaining the cell gap.

The spacer is formed in a ball spacer or a column spacer. The ball spacer is mixed with a solution at a predetermined density and is distributed on the substrate from a nozzle at a high pressure. The column spacer is attached to the substrate having the gate or data lines. If the ball spacer is applied to a large-sized panel, it has a problem in that the cell gap is not constant. Thus, it may be preferable to form the column spacer on the large-sized panel. Currently, the column spacer is made of photosensitive organic resin.

Figure 5D:
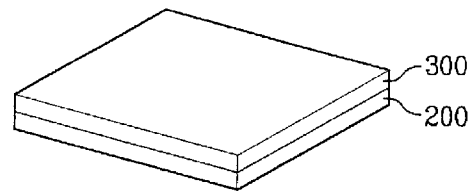

Referring to FIG. 5D, the lower and upper substrates 200, 300 are attached to each other.

The substrate having the liquid crystal is fixed to a lower space, and the other substrate is fixed to an upper space. At this time, the surface of the other substrate on which layers are formed is faced to the surface of the substrate on which the liquid crystal is formed. Then, the upper substrate is pressed to the lower substrate to attach the lower and upper substrates to each other. In another way, in a state of that the lower substrate is spaced from the upper substrate at a predetermined portion, the lower and upper substrates are maintained at a vacuum state, and then the lower and upper substrates are attached in atmospheric pressure.

Figure 5E:
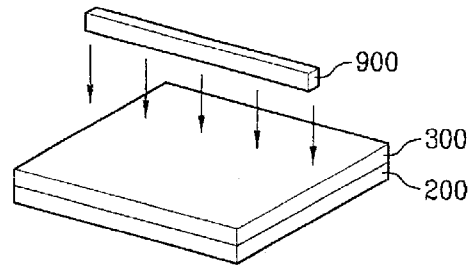

As shown in FIG. 5E, UV light is irradiated onto the attached lower and upper substrates 200, 300 by an UV irradiating device 900. At this time, the UV light is irradiated to the surface of the upper substrate 300. If the UV light is irradiated to the substrates, the monomers or oligomers are polymerized, which is activated by the initiator included in the UV hardening main and dummy sealants 700, 800, and then the monomers or oligomers are hardened, thereby bonding the lower and upper substrates 200, 300 to each other.

In a case in which the UV light is irradiated to the portion of the UV hardening dummy sealant 800 where the UV blocking part 750 is formed, the UV hardening dummy sealant 800 is not hardened. That is, the UV hardening dummy sealant 800 is maintained in a fluid state, so that the portion can be easily cut during the process of cutting the attached substrates into the unit cells.

If the monomers or oligomers each having one end coupled to acrylic group and the other end coupled to epoxy group mixed with an initiator are used as the UV hardening main and dummy sealants 700, 800, the epoxy group is not reactive with UV light irradiation. That is, heat must be additionally applied to the sealant for about one hour at a temperature of 120° C. to harden the sealant after irradiating the UV light.

Even if the dummy sealant not hardened during the UV irradiating process is hardened by heating in the above conditions, the ratio of hardening is below 50%. Thus, the cell cutting process is not affected by the heating.

Figure 6:
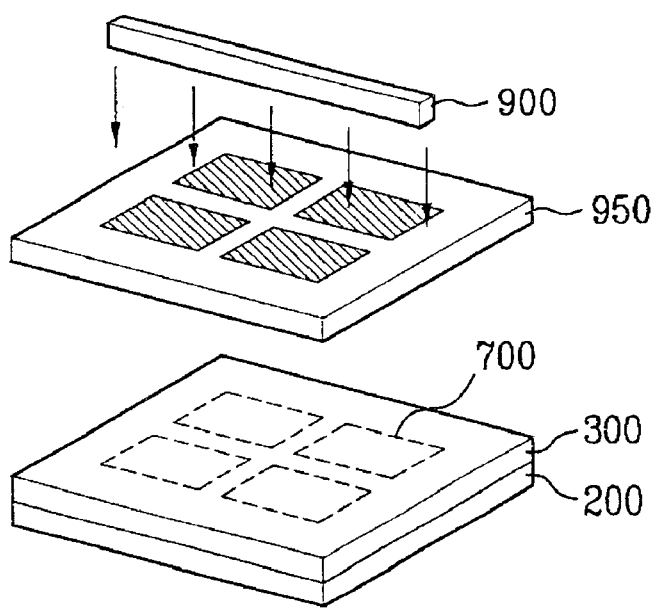
FIG. 6 illustrate a perspective view for showing a UV irradiating step in a liquid crystal display device according to the second embodiment of the present invention.

If the UV light is irradiated to the entire surface of the substrate during the UV irradiating process, the characteristic of the TFT formed on the substrate may be deteriorated. Also, a pretilt angle of the alignment layer, which is formed for initially aligning the liquid crystal, may be changed. Preferably, a mask 950 for blocking an active region inside the UV hardening dummy sealant 800 is provided between the UV irradiating device 900 and the attached substrates, as shown in FIG. 6.

Figure 5F:
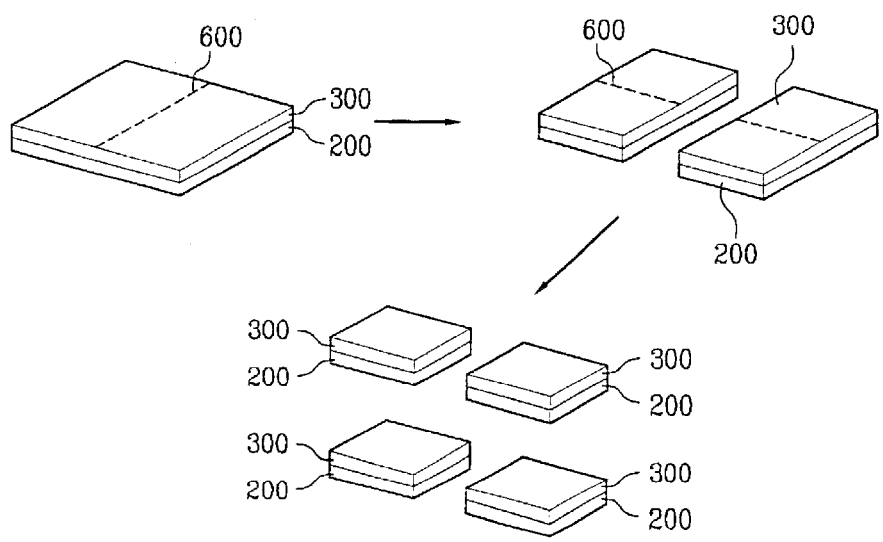

As shown in FIG. 5F, the bonded substrates are cut into the unit cells. In the cell cutting process, a pen or wheel of diamond may be used to carry out the scribing and the breaking in one step, to obtain the unit cells one by one.

Although not shown, a final testing process is performed after cutting the substrate into the unit cells. In the testing process, the unit cells are checked for any failure, and each pixel electrode is appropriately driven when a voltage is applied or is not applied.

The LCD device and the method for manufacturing the same according to the present invention have the following advantages.

In the present invention, the UV blocking part is formed under the UV hardening dummy sealant in the portion where the UV hardening dummy sealant is overlapping with the cell-cutting line. Accordingly, the UV hardening dummy sealant is not hardening in the portion where the UV blocking part is formed during irradiating the UV ray, thereby easily cutting the substrate into the unit cells.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device, comprising:
   a substrate;
   a UV hardening main sealant on the substrate;
   a UV hardening dummy sealant in a region between the UV hardening main sealant and an edge of the substrate; and
   a UV shielding part formed in a portion where the UV hardening dummy sealant is overlapped with a cell-cutting line.

2. The device of claim 1, wherein the UV shielding part is formed under the UV hardening dummy sealant.

3. The device of claim 1, wherein the UV shielding part is formed over the UV hardening dummy sealant.

4. The device of claim 1, wherein the UV shielding part is formed under and over the UV hardening dummy sealant.

5. The device of claim 1, wherein the UV shielding part is formed between the UV hardening dummy sealant and the substrate.

6. The device of claim 1, wherein the UV shielding part is formed at all intersections of the UV hardening dummy sealant and the cell-cutting line.

7. The device of claim 1, wherein the UV shielding part is formed at intersections of the UV hardening dummy sealant and the cell-cutting line at at least one side edge of the substrate.

8. The device of claim 1, wherein the UV shielding part is formed at intersections of the UV hardening dummy sealant and the cell-cutting line at opposite side edges of the substrate.

9. The device of claim 1, wherein the substrate includes a gate line, a data line, a thin film transistor and a pixel electrode.

10. The device of claim 9, wherein the UV shielding part is formed on the same layer as the gate line.

11. The device of claim 9, wherein the UV shielding part is formed on the same layer as the data line.

12. The device of claim 1, wherein the substrate includes a light-shielding layer, a color filter layer and a common electrode.

13. The device of claim 12, wherein the UV shielding part is formed on the same layer as the light-shielding layer.

14. The device of claim 1, further comprising a column spacer on the substrate.

15. A method for manufacturing an LCD device comprising:
preparing first and second substrates;
forming a UV shielding part in a dummy region on one of first and second substrates;
forming a UV hardening main sealant on the substrate on which the UV shielding part is formed;
forming a UV hardening dummy sealant on the substrate between the UV hardening main sealant and an edge of the substrate;
applying a liquid crystal on one of the first and second substrates;
attaching the first and second substrates;
irradiating UV light onto the UV hardening main sealant and UV hardening dummy sealant; and
cutting the substrates into unit cells.

16. The method of claim 15, further comprising:
forming gate and data lines on the first substrate;
forming a thin film transistor at a crossing point of the gate and data lines; and
forming a pixel electrode on the first substrate.

17. The method of claim 16, wherein the UV shielding part is formed with the gate line.

18. The method of claim 16, wherein the UV shielding part is formed with the data line.

19. The method of claim 15, further comprising:
forming a light-shielding layer on the second substrate; and
forming a color filter layer on the light-shielding layer.

20. The method of claim 19, wherein the UV shielding part is formed with the light-shielding layer.

21. The method of claim 15, wherein the UV light is irradiated to the surface of the substrate on which the UV shielding part is formed.

22. The method of claim 15, further comprising heating the attached substrates after irradiating UV light to the attached substrates.

23. The method of claim 15, wherein cutting the substrates includes scribing and breaking processes in one step.

24. The method of claim 15, wherein irradiating UV light includes masking an active area inside the UV hardening main sealant.

25. The method of claim 15, wherein the UV hardening main and dummy sealants are formed on the second substrate, and the liquid crystal is dropped on the first substrate.

26. The method of claim 15, wherein the UV hardening main and dummy sealants are formed on the first substrate, and the liquid crystal is dropped on the second substrate.

27. The method of claim 15, further comprising a column spacer on one of the first and second substrates.

28. The method of claim 15, wherein the UV shielding part is formed in a portion where the UV hardening dummy sealant is overlapped with a cell-cutting line.

* * * * *

UNITED STATES PATENT AND TRADEMARK OFFICE
CERTIFICATE OF CORRECTION

PATENT NO. : 6,628,365 B1
DATED : September 30, 2003
INVENTOR(S) : Moo Yeol Park et al.

It is certified that error appears in the above-identified patent and that said Letters Patent is hereby corrected as shown below:

Title page,
Item [54], Title, should read -- LIQUID CRYSTAL DISPLAY DEVICE AND METHOD FOR MANUFACTURING THE SAME --.

Signed and Sealed this

Seventeenth Day of January, 2006

JON W. DUDAS
*Director of the United States Patent and Trademark Office*